United States Patent
Domeier et al.

(10) Patent No.: US 6,929,733 B2
(45) Date of Patent: Aug. 16, 2005

(54) SACRIFICIAL PLASTIC MOLD WITH ELECTROPLATABLE BASE

(75) Inventors: Linda A. Domeier, Danville, CA (US); Jill M. Hruby, Livermore, CA (US); Alfredo M. Morales, Livermore, CA (US)

(73) Assignee: Sandia Corporation, Livermore, CA (US)

( * ) Notice: Subject to any disclaimer, the term of this patent is extended or adjusted under 35 U.S.C. 154(b) by 196 days.

(21) Appl. No.: 10/134,060

(22) Filed: Apr. 24, 2002

(65) Prior Publication Data

US 2002/0117599 A1 Aug. 29, 2002

Related U.S. Application Data

(62) Division of application No. 09/765,078, filed on Jan. 17, 2001, now Pat. No. 6,422,528.

(51) Int. Cl.[7] ............... C25D 1/00; C25D 1/08; C25D 1/10; B29B 7/00; B29C 43/00
(52) U.S. Cl. ............... 205/67; 205/70; 205/75; 264/219; 264/221; 264/222; 264/226; 264/322; 264/325; 264/328.1
(58) Field of Search ............... 264/219, 221, 264/222, 226, 322, 325, 328.1; 205/67, 70, 75

(56) References Cited

U.S. PATENT DOCUMENTS

| | | | | |
|---|---|---|---|---|
| 3,535,211 A | * | 10/1970 | Frowde | 205/67 |
| 4,336,221 A | | 6/1982 | Garabedian | 264/241 |
| 4,541,977 A | | 9/1985 | Becker et al. | 264/102 |
| 4,661,212 A | | 4/1987 | Ehrfeld et al. | 204/11 |
| 4,981,558 A | | 1/1991 | Maner | 204/11 |
| 5,055,163 A | | 10/1991 | Bier et al. | 204/11 |
| 5,073,237 A | | 12/1991 | Bacher et al. | 264/320 |
| 5,162,078 A | | 11/1992 | Bley et al. | 205/75 |
| 5,378,583 A | | 1/1995 | Guckel et al. | 430/325 |
| 5,676,983 A | | 10/1997 | Bacher et al. | 425/385 |
| 5,780,140 A | | 7/1998 | Nilsen | 428/172 |
| 5,795,519 A | | 8/1998 | Bacher et al. | 264/139 |
| 5,875,549 A | | 3/1999 | McKinley | 29/889.2 |
| 6,149,160 A | * | 11/2000 | Stephens et al. | 277/399 |
| 6,375,870 B1 | * | 4/2002 | Visovsky et al. | 264/1.31 |
| 2003/0057096 A1 | * | 3/2003 | Morales et al. | 205/67 |

FOREIGN PATENT DOCUMENTS

| | | | | |
|---|---|---|---|---|
| JP | 05038774 A | * | 2/1993 | B32B/3/24 |
| RU | 2184799 C1 | | 7/2002 | |

* cited by examiner

*Primary Examiner*—Edna Wong
(74) *Attorney, Agent, or Firm*—Barry G. Thibault; Reed Intellectual Property Law Group

(57) ABSTRACT

A sacrificial plastic mold having an electroplatable backing is provided. One embodiment consists of the infusion of a softened or molten thermoplastic through a porous metal substrate (sheet, screen, mesh or foam) and into the features of a micro-scale molding tool contacting the porous metal substrate. Upon demolding, the porous metal substrate will be embedded within the thermoplastic and will project a plastic structure with features determined by the mold tool. This plastic structure, in turn, provides a sacrificial plastic mold mechanically bonded to the porous metal substrate which provides a conducting support suitable for electroplating either contiguous or non-contiguous metal replicates. After electroplating and lapping, the sacrificial plastic can be dissolved to leave the desired metal structure bonded to the porous metal substrate. Optionally, the electroplated structures may be debonded from the porous substrate by selective dissolution of the porous substrate or a coating thereon.

16 Claims, 9 Drawing Sheets

SACRIFICIAL PLASTIC MOLD WITH ELECTROPLATABLE BASE

CROSS-REFERENCE TO RELATED APPLICATIONS

This is a divisional of U.S. patent application Ser. No. 09/765,078, filed Jan. 17, 2001, now U.S. Pat. No. 6,422,528 to Domeier et al., the disclosure of which is incorporated by reference herein.

ACKNOWLEDGEMENT OF GOVERNMENT SUPPORT

The United States Government has rights in this invention pursuant to Contract No. DE-AC04-94AL85000 between the United States Department of Energy and Sandia Corporation for the operation of Sandia National Laboratories.

TECHNICAL FIELD

The present invention relates to the replication of metal micro-scale parts, and more specifically, it relates to the production of sacrificial, electroplatable molds. Such electroplatable molds enable the efficient replication of metal micro-scale parts, which would otherwise require the iteration of synchrotron exposures and other costly or time-consuming processes.

BACKGROUND

A key challenge in LIGA (described below) is the replication of multiple sacrificial molds for the electroplating of metal parts/structures. Many applications require metal parts for mechanical, electrical or other reasons. The ability to replicate electroplatable plastic molds would eliminate the need for repetitive synchrotron exposures, a costly and time-consuming step, as well as the subsequent development step.

The production of micro-scale metal parts via LIGA (German acronym for lithography, electroplating and molding) is a multi-step process requiring mask production, synchrotron exposure of the polymethylmethacrylate (PMMA) substrate (typically PMMA bonded to a metallized silicon wafer or a solid metal plate), development of the PMMA, electroplating to fill the cavities left within the PMMA mold, lapping and final dissolution of the remaining PMMA. Such technology is described in U.S. Pat. No. 5,378,583. A constraining step in this process is the requirement for access to one of the very limited number of synchrotron facilities. If the electroplatable PMMA (or other plastic) molds could be replicated without the need for repetitive synchrotron exposures, this would provide an enormous savings in time and cost in the production of larger quantities of the desired metal parts.

Numerous approaches to this replication problem have been explored at Kernforschungszentrum Karlsruhe GmbH.

U.S. Pat. No. 4,541,977, titled "Method For Producing Separating Nozzle Elements," is directed to a very specific method for producing a complex multi-nozzle assembly including an array of micro-channels and nozzles held between top and bottom plates with corresponding inlets and outlets. This assembly is used for the separation of gaseous or vaporous mixtures. A process for the replication of the internal features is described which infuses a polymer into a master mold of the internal features contacting a metallic bottom plate. Upon removal of the master mold, the negative plastic mold remains adhered to the bottom plate due to the presence of dove-tailed inlets which lock onto the infused plastic. Subsequent electroplating of this structure provides a metal replicate of the original master features from which the plastic mold can then be removed.

U.S. Pat. No. 4,661,212, titled "Method For Producing A Plurality Of Plate Shaped Microstructured Metal Bodies," provides a number of more general approaches for producing electroplatable plastic molds that rely on the use of metal or carbon filled PMMA formulations. Different methods are used depending on whether the features to be electroplated are contiguous or non-contiguous. Non-contiguous features require the casting of an unfilled non-conductive PMMA resin into the features of a master mold followed by a second overlay casting with a filled conductive PMMA. Upon demolding from the master, this filled PMMA provides a conductive and electroplatable base to which the unfilled PMMA features are bonded. One variation on this approach describes the prefabrication of a two-layer PMMA substrate in which one layer is unfilled and insulating and the bottom layer contains a conductive filler. This two-layer substrate is embossed with a master such that the features of the master penetrate through the insulating unfilled layer into the conductive filled layer. Such two-layer substrates are also used in other patents referenced below. The same patent describes another process suitable only for contiguous features in which the master mold is first dip-coated to apply a thin mold release layer to the feature tops and then similarly dip-coated in a conductive, filled PMMA formulation such that the feature tops only are coated. The wells between the features on this mold are then filled and covered over with an unfilled, non-conductive PMMA material. Upon demolding, the contiguous conducting path of the filled PMMA layer allows electroplating of the desired metal replicate.

U.S. Pat. No. 4,981,558 titled "Process For The Reproduction Of A Microstructured, Plate-Shaped Body," discloses a process similar to that in U.S. Pat. No. 4,661,212 with the addition of the use of ultrasound to enhance penetration of the metal master through the insulating top layer and into the conducting PMMA bottom layer of a pre-formed two-layer PMMA substrate. Use of ultrasound permits the elimination of the heating and cooling steps normally involved in such embossing procedures.

U.S. Pat. No. 5,055,163 is titled "Process For Producing A Two-Dimensionally Extending Metallic Microstructure Body With A Multitude Of Minute Openings And A Tool Suitable For This Invention," describes a more specific process similar to that in U.S. Pat. No. 4,661,212 in which a master mold with multiple tapered projections is embossed into a two-layer substrate in which the conducting lower layer might be a filled PMMA, another filled polymer or a low melting metal. The tapered feature tips facilitate penetration of the master features through the top layer and into the conducting layer of the substrate. The use of cylindrical master tools in a continuous process and the use of ultrasound are also described.

U.S. Pat. No. 5,073,237 titled "Method Of Making Molds For Electrodeposition Forming Of Microstructured Bodies," discloses a method that overcomes some of the difficulties associated with the preceding processes by using a two-layer substrate that consists of a sputtered or vapor deposited film of metal or carbon on an insulating polymer base such as PMMA. During the standard embossing process, the metal film along the walls of the embossed features is stretched and disrupted to form a discontinuous and therefore non-conductive array of isolated spangles of the deposited film. The film in the bottom of the embossed features is not disrupted in this manner and provides a conductive contact for subsequent electroplating of the features. The features in this case must be contiguous, however.

It is important in the electroplating of micro-features with high aspect ratios that the walls of the electroplating mold be non-conductive. If the feature walls as well as the feature bases are conductive, the electroplating process will tend to close off the feature cavity before it has been completely plated up from the bottom. Such difficulties preclude the simple deposition of a metallic conducting film on the surface of a sacrificial plastic mold prior to electroplating or the use of conductive plastics in a standard embossing or injection molding process to form sacrificial molds. In the case of low aspect ratio features, either of the above options is readily applicable.

U.S. Pat. No. 5,162,078, titled "Method Of Producing Microstructured Metallic Bodies," is directed to the removal by reactive ion etching of residual polymeric films in the bottom of plastic mold cavities, which would prevent electroplating on the conductive base supporting those features. Such residues are a potential problem when embossing through the two-layer substrates described in many of the above patents. The reactive ion etch is directed perpendicularly to the surface of the base plate to avoid degradation of the plastic features.

U.S. Pat. No. 5,676,983 titled "Tool For Making A Microstructured Plastic Mold From Which Structures Can Be Formed Galvanically," and U.S. Pat. No. 5,795,519 titled "Process Of Making A Microstructured Plastic Mold," again utilize a two-layer substrate but provide an embossing master tool in which the features have smooth walls but the top surfaces of the features possess rough surfaces having points and ridges adapted to penetrate into the electrically insulating layer. This enhanced penetration allows the embossing tool to more efficiently expose the electrically insulating layer at the bottom of the embossed cavities.

None of the above processes provide a simple and versatile method of replicating either contiguous or non-contiguous features in a sacrificial plastic mold. Many require the pre-fabrication of specific plastic substrates, which contain a conducting layer adhered to a non-conducting layer with precise height requirements. Various techniques have been used to insure penetration of the tooled embossing features through the non-conducting layer into the conducting layer. Some of these require the fabrication of special embossing tools with sharpened or roughened features. Some of the above techniques are also applicable only to contiguous features, a major limitation. There remains a need in the micro-fabrication art for a general method capable of replicating metal structures and parts now made by processes such as the described LIGA technology.

SUMMARY OF THE INVENTION

It is an object of the present invention to provide a sacrificial plastic mold having an electroplatable backing.

It is another object of the present invention to provide sacrificial plastic molds by the use of plastic forming technologies and without the use of repetitive lithographic exposures.

It is still another object of the present invention to provide sacrificial plastic molds with more than one level features, wherein the features in the different levels may be the same or different.

It is a further object of the present invention to provide sacrificial plastic molds in which either contiguous or non-contiguous features may be electroplated.

It is still a further object of the invention to provide a method for making a sacrificial plastic mold having an electroplatable backing.

Additional objects, advantages and novel features of the invention will be set forth in part in the description that follows, and in part will become apparent to those skilled in the art upon examination of the following, or may be learned by practice of the invention.

Whether contiguous or non-contiguous, it is also an object of the present invention to produce sacrificial plastic molds with more than one level of features. Embossing or injection molding tools can be fabricated with multiple levels with different features using known LIGA and micro-machining technology. Such multiple levels of features can also be replicated in the plastic molds of this invention and in the electroplated metal parts produced from those molds.

In one embodiment, the invention provides a sacrificial plastic mold having an electroplatable backing, wherein the mold comprises the product of the infusion of a softened or molten thermoplastic through a porous metal substrate (sheet, screen, mesh or foam) and into the features of a micro-scale master mold supporting or contacting the porous metal substrate. Upon cooling of the thermoplastic and demolding, the porous metal substrate will be embedded within the surface of the thermoplastic and the surface of the porous metal substrate will project a plastic structure with features determined by the master mold. This plastic structure, in turn, provides a sacrificial plastic mold that can be used to replicate the features of the original master mold. In particular, the porous metal substrate to which the plastic mold is mechanically bonded provides a conducting support suitable for electroplating processes. After electroplating, the plated metal can be lapped and polished and the sacrificial plastic can be dissolved to leave the replicated metal structure bonded to the metal substrate.

If a metal structure is desired, the plastic mold can be overplated and the overplated metal then lapped and polished to provide a metal base containing the electroplated features. The porous metal substrate might then be removed by machining and polishing processes. Alternatively, the electroplated parts may also be debonded from the metal substrate by the use of different metals for the substrate and electroplating process and subsequent selective dissolution of the substrate metal. In another variation, an appropriate metal coating or strike might be deposited on the porous metal substrate, before or after the embossing or molding process used to form the sacrificial plastic mold. That metal strike might then be selectively dissolved to release the plated metal parts.

If free metal parts are desired they might either be underplated or the overplated metal might be machined away to the level of the plastic micro-mold. The porous metal substrate or base might then be removed by lapping prior to dissolution of the plastic mold. Alternatively, the electroplated parts may also be debonded from the metal substrate by the use of different metals for the substrate and electroplating process and subsequent selective dissolution of the substrate metal. In another variation also used with the metal structures above, an appropriate metal coating or strike might be deposited on the porous metal substrate, before or after the embossing or molding process used to form the sacrificial plastic mold. That metal strike might then be selectively dissolved to release the plated metal parts.

Both hot embossing and injection molding processes may be used to infuse the thermoplastic through the porous metal substrate and into the contacting mold. The arrangement of the porous metal substrate, the master mold and the infused polymer will vary according to the process used. In both processes, it is often desirable to carry out the plastic infusion and feature replication under vacuum to avoid air entrapment and loss of fidelity in the replicated features.

DETAILED DESCRIPTION OF THE INVENTION

Before describing the present invention in detail, it is to be understood that unless otherwise indicated this invention is not limited to specific thermoplastic substrates, porous metal substrates, patterning methods, or the like, as such may vary.

It must be noted that, as used in this specification and the appended claims, the singular forms "a," "an," and "the" include plural referents unless the context clearly dictates otherwise. Thus, for example, reference to "a" thermoplastic material includes mixtures of thermoplastic materials, reference to "a porous metal substrate" includes reference to two or more porous metal substrates, reference to "a microscale feature" includes multiple microscale features, and the like.

Figure 1A:
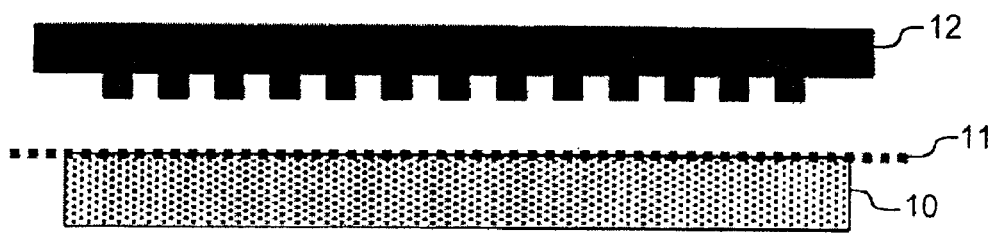
FIG. 1A shows a thin perforated metal substrate lying on a plastic substrate. A metal embossing tool is shown above these materials.
Figure 1B:
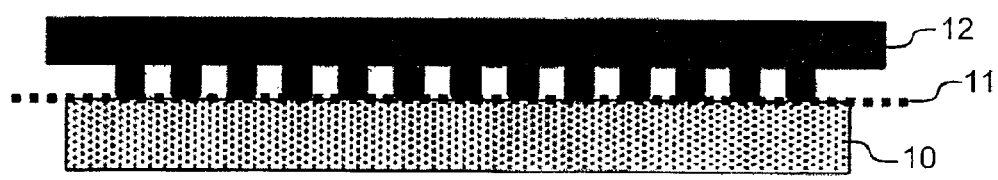
FIG. 1B shows the metal embossing tool in contact with the perforated metal substrate.
Figure 1C:
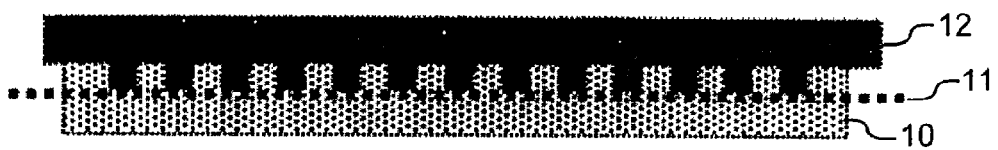
FIG. 1C illustrates plastic flow through the pores or perforations in the metal substrate as the temperature of the plastic substrate is raised. This plastic then fills the cavities in the metal embossing tool.
Figure 1D:
FIG. 1D shows the embossed plastic and the perforated metal after the plastic has cooled and the metal embossing tool has been removed.
Figure 1E:
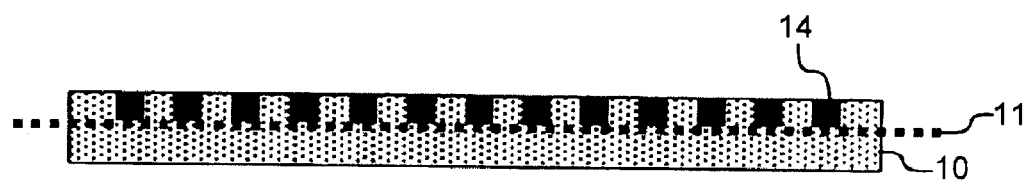
FIG. 1E shows the plastic micro-mold and the perforated metal after the cavities in the plastic mold have been filled with electroplated metal. In this case, any overplated metal has been removed by lapping and polishing.
Figure 1F:
FIG. 1F shows the remaining electroplated metal structure after the sacrificial plastic mold has been dissolved.

FIGS. 1A–1F illustrate one embodiment of the present invention that utilizes the hot embossing of sacrificial plastic molds for electroplating metal structures. FIG. 1A shows a plastic substrate 10 in contact with a porous metal substrate, in this case a perforated metal screen 11. An embossing tool 12 is positioned above the metal screen 11. The embossing tool containing the micro-scale features may be fabricated, e.g., using the LIGA process. In such a tool fabrication process, a solid metal plate might be used as the base supporting the PMMA resist material in such a process and would thus provide a metal tool onto which the microfeatures have been electroplated. Alternatively, a silicon wafer might be used as the base and the electroplated metal can then be overplated and machined to provide the final metal tool to which the electroplated features are attached. The silicon wafer would then be released by dissolution processes. The embossing process is usually performed under vacuum. In FIG. 1B, the embossing tool 12 and the perforated metal 11 are brought in contact. Either before or after contact, the temperature of the plastic substrate 10 is raised to a point at which the plastic resin is softened enough to flow. Upon the application of compressive force, the perforated metal substrate 11 will be pressed into the plastic substrate 10 as the plastic flows through the pores or perforations in the metal 11 and fills in the features of the embossing tool 12. This is shown in FIG. 1C. It will be appreciated by those skilled in the art that the amount of compressive force required to carry out the aforementioned step will vary with several factors, e.g., the particular metal substrate employed, the selected plastic, temperature, etc. However, the compressive force applied will generally be in the range of approximately 25 psi to 2500 psi. After the metal embossing tool 12 is removed, the embossed plastic and the perforated metal remain together as shown in FIG. 1D and provide the desired sacrificial plating mold. Using standard electroplating processes, the plastic mold is then filled in with electroplated metal 14 as shown in FIG. 1E. Suitable metals that can be used for electroplating include, but are not limited to, nickel, copper, silver, platinum, gold, nickel/iron, nickel/cobalt, nickel/tungsten, tin/lead and other mixtures and alloys thereof. Machining and polishing processes might be employed as needed to level any overplated metal to the height shown. The electroplated metal structure consisting of the electroplated metal 14 attached to the perforated metal substrate 11, as shown in FIG. 1F, remains after the sacrificial plastic mold is dissolved. As noted above, various selective metal dissolution or overplating and lapping processes might also be used to provide free metal parts or structures.

Figure 2A:
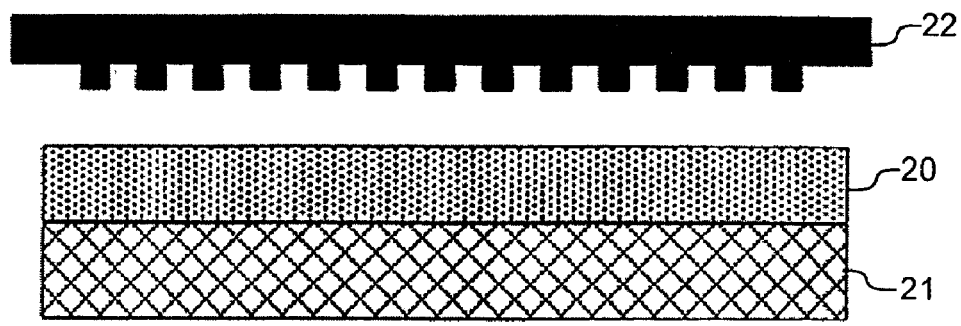
FIG. 2A shows a plastic substrate lying on top of a porous metal mesh. A metal embossing tool is shown above these materials.
Figure 2B:
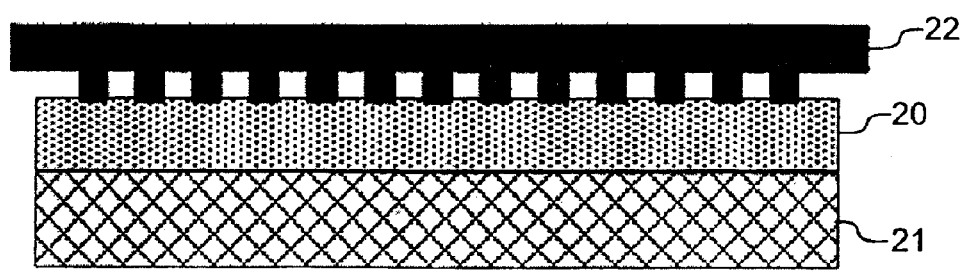
FIG. 2B shows the metal embossing tool in contact with the plastic substrate.
Figure 2C:
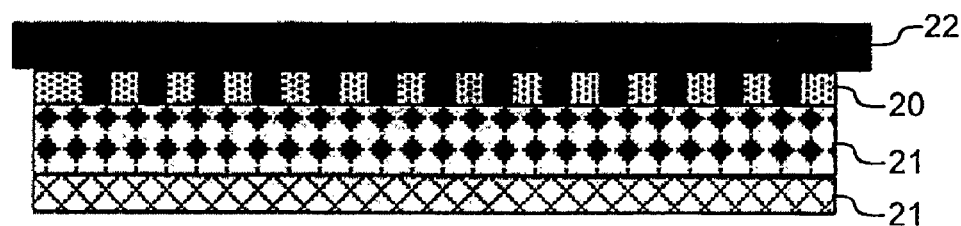
FIG. 2C illustrates plastic flow through the porous metal mesh as the temperature of the plastic substrate is raised. This plastic also fills the cavities in the metal embossing tool.
Figure 2D:
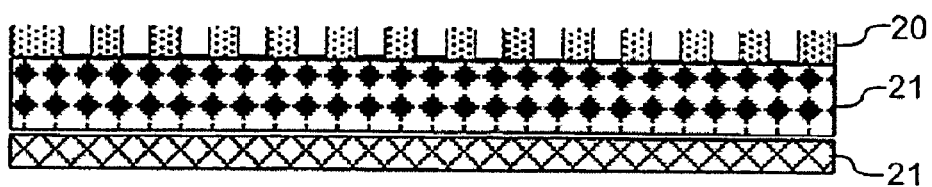
FIG. 2D shows the embossed plastic and the metal mesh after the metal embossing tool has been removed. A portion of the metal mesh is shown to be infused with plastic.
Figure 2E:
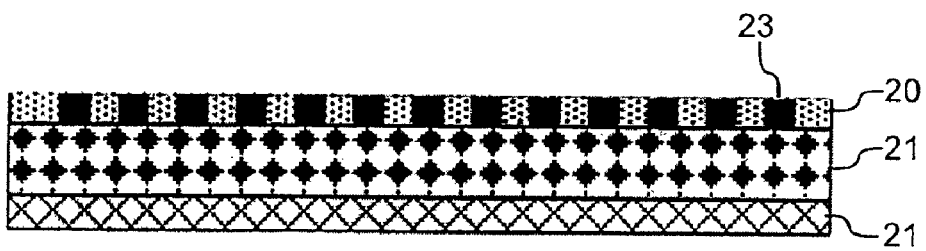
FIG. 2E shows the plastic micro-mold and the metal mesh after the cavities in the plastic mold have been filled with electroplated metal. In this case, any overplated metal has been removed by lapping and polishing.
Figure 2F:
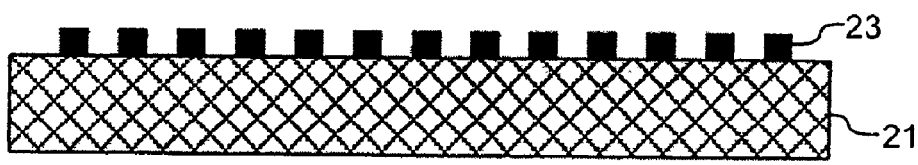
FIG. 2F shows the remaining electroplated metal structure after the sacrificial plastic mold has been dissolved.

FIGS. 2A–2F illustrate another embossing technique where the plastic substrate is initially located between the embossing tool and the porous metal substrate, in this case a metal mesh. FIG. 2A shows the plastic substrate 20 located between the metal mesh 21 and metal embossing tool 22. In FIG. 2B, the embossing tool is in contact with the plastic substrate. After the plastic substrate 20 is heated to a temperature where the plastic is softened enough to flow, compressive force is applied and the plastic allowed to fill in the features of the embossing tool and also flow into the metal mesh until the embossing tool contacts the mesh. This is shown in FIG. 2C where the top portion 21' (not shown) of the metal mesh is infused with plastic. For most plastics, the temperature required for softening is generally in the range of about 750° C. to 200° C., and the corresponding compressive force required to fill in the features in the embossing tool is generally in the range of approximately 25 psi to 2500 psi. FIG. 2D shows the embossed plastic 20 and the metal mesh 21 and 21' after the metal embossing tool 22 has been removed. In the next step, the plastic micro-mold of FIG. 2D is electroplated with metal 23 as shown in FIG. 2E. The electroplated metal structure that results from dissolution of the sacrificial plastic mold of FIG. 2E is shown in FIG. 2F. Again, various processes might be used to obtain free metal parts or structures after the electroplating step.

Figure 3A:
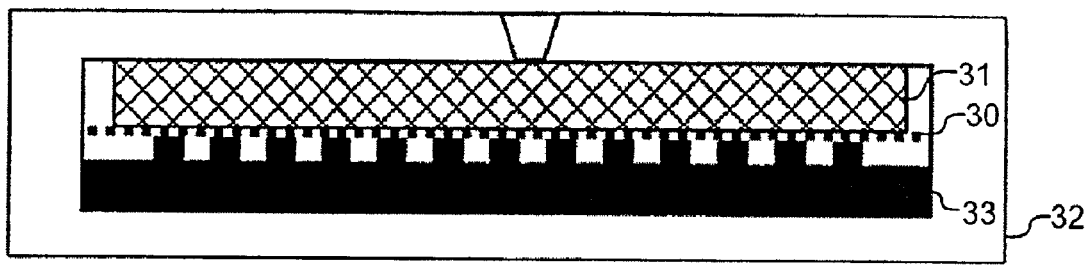
FIG. 3A shows a mold cavity with a tooled metal insert in the bottom. Lying on top of that tooled insert is a thin porous metal substrate and filling the remainder of the mold cavity is a porous metal mesh.
Figure 3B:
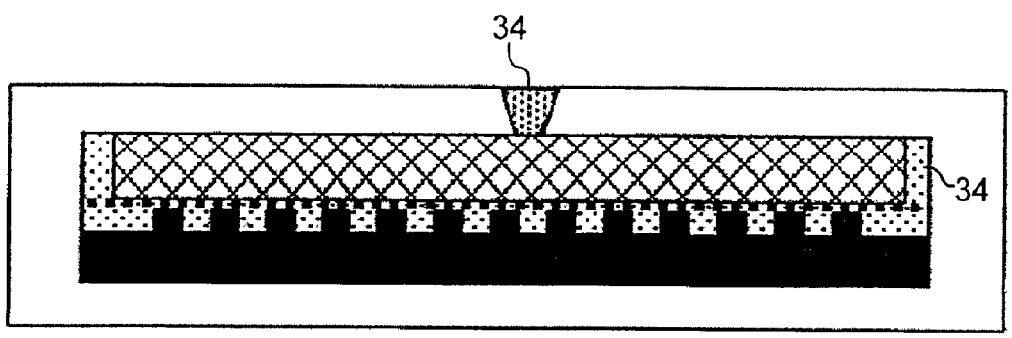
FIG. 3B shows the mold cavity filled with injection-molded plastic which has infused the porous metal substrates and the features in the tooled insert.
Figure 3C:
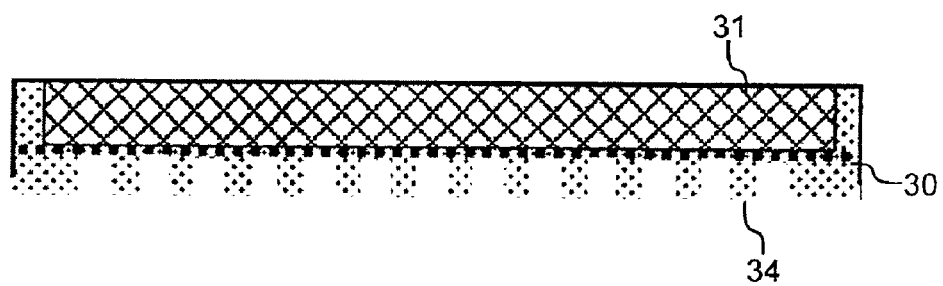
FIG. 3C shows porous metal substrates and the molded plastic features after removal from the mold cavity.
Figure 3D:
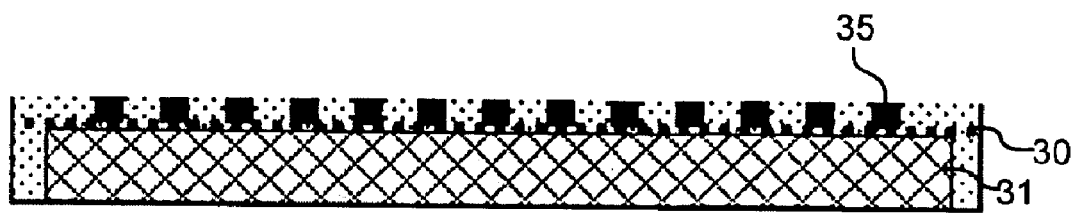
FIG. 3D shows the plastic micro-mold and the porous metal substrates after the cavities in the plastic mold have been filled with electroplated metal. In this case, any overplated metal has been removed by lapping and polishing.
Figure 3E:
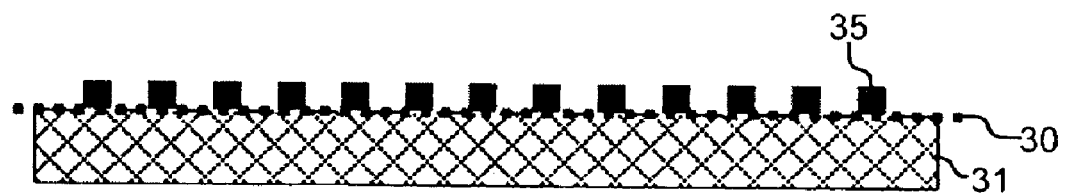
FIG. 3E shows the remaining electroplated metal structure after the sacrificial plastic mold has been dissolved.

FIGS. 3A–3E illustrate another embodiment of the present invention, which uses injection molding of the thermoplastic material in combination with one or more porous metal substrates placed within the injection-molding cavity. As shown in FIG. 3A, both a perforated metal sheet 30 and a soft, porous metal mesh 31 are stacked within the injection-molding cavity 32 on top of the tooled mold 33. Upon injection, the molten plastic 34 is infused through both porous metal substrates 30 and 31 into the tooled features of tooled mold 33 as shown in FIG. 3B. FIG. 3C shows the injected plastic 34 and porous metals 30 and 31 after removal from the mold cavity 32. FIG. 3D shows the plastic micro-mold filled in with electroplated metal 35 and FIG. 3E shows the electroplated metal structure, which consists of metal mesh 31, perforated metal sheet 30 and electroplated metal 35, after dissolution of the sacrificial plastic mold.

A rigid metal mesh or other porous metal may replace the perforated metal screen in the above-described embodiment. The use of the softer high porosity mesh is also optional and is meant to insure the rigid mesh or screen does not move away from the tooled cavity face during resin injection. Other methods, such as a pattern of studs either on the metal substrate or the opposing mold face to prevent such movement of the porous metal substrate might also be used.

The tooled features in the injection molding cavity might be provided by the LIGA fabrication of a metal tool, similar to those used in the above hot embossing processes, which is inserted into an injection mold base designed to accommodate interchangeable tooling inserts. This type of injection molding process, which uses free porous metal substrates in the mold cavity, is facilitated by a vertical arrangement of the injection-molding machine.

A variety of porous metal materials suitable for use in the processes embodied above are available commercially. For example, Mott Industrial (division of Mott Corporation in Farmington, Conn.) manufactures a range of hard sintered meshes widely used in filtering and sparging applications. These are available in a range of metals (stainless steel, Monel, nickel, Hastelloy, Inconel, titanium, silver, gold and platinum) are sintered into a variety of shapes with average porosities of 0.2, 0.5, 1, 2, 5, 10, 20, 40 and 100 microns. Technetics Corporation in DeLand, Fla. manufactures porous metal felts from various alloys using 10-150 micron fibers and 35–90% pore volumes. Buckbee-Mears St. Paul (division of BMC Industries, Inc. in Minneapolis, Minn.) manufactures micro-etched metal screens with a wide range of hole sizes (down to 3 mils in diameter) and in various spatial arrangements. Specialty metals other than the standard stainless steel can be requested. Inco Limited in Toronto, Canada manufactures compressible woven mats from nickel.

Any of these porous metal substrates might be modified by the application of a thin metal coating or strike suitable for later dissolution. Such a coating might be applied by electroplating techniques or by other metal coating techniques known in the art. While coatings of many metals might easily be applied, copper is most commonly used in the case of nickel-plated parts due to the selective etching behavior of copper.

A variety of thermoplastic substrates are usable in both the hot embossing and injection-molding processes described above and are well known in the art. This class of plastic materials (also referred to as resins or polymers) is characterized by their ability to soften and become moldable at elevated temperatures and to become hard when cooled. Some of the common thermoplastics include acetals, acrylics such as polymethylmethacrylate, acrylonitrile-butadiene-styrene (ABS) resins, cellulosics (e.g., Cellophane®), polyamides (nylon), polyarylates, polysulfones, polycarbonates, polyesters (PBT and PET), polyethylene, polypropylene, polystyrene, polytetrafluoroethylene (Teflon®), polyurethanes, polyvinyl chloride (PVC) and many others including copolymers and polymer blends. Such thermoplastics are typically available in a range of melt flow grades and might also be modified with various additives and fillers. Suitable additives include, for example, antioxidants, light and UV stabilizers, flow modifiers, anti-static modifiers, plasticizers, brighteners, and others while suitable fillers include, but are not limited to, inorganic fillers (such as calcium carbonate, clays and metal oxides), polymeric fillers (such as Teflonpowder), pigments and dyes, silicas and others.

A feature important to the sacrificial plastic molds of this invention is their ability to be dissolved in appropriate solvents such as aliphatic hydrocarbons, ketones, halogenated hydrocarbons, aromatic hydrocarbons, alcohols, ethers, hydrofluoroethers and hydrofluorocarbons, glycols, glycol ethers and glycol esters, carbonates, polar aprotic solvents such as dimethylsulfoxide and dimethylformamide, and others. These will vary in usefulness according to the nature of the thermoplastic. Commonly used solvents to dissolve thermoplastics would include acetone, dichloromethane, dimethylformamide and tetrahydrofuran. Some thermoplastics are also susceptible to aqueous acids or bases. In particular, polyacetals are readily dissolved in phenolic and inorganic acids and polyesters can be dissolved in strong base. Appropriate radiation, oxidative, thermal or other treatments might be used to degrade the molecular structure of the thermoplastic to enhance the solubility of the sacrificial mold or to directly remove the plastic. This might include UV or x-ray exposure or an ashing treatment.

The use of replicated sacrificial molds for the production of electroplated metal structures and parts provides significant savings in both time and money in the production of larger volumes of micro-scale devices. In contrast to the standard LIGA process, only one synchrotron exposure is needed to fabricate a molding or embossing tool that can then be used to form repetitive copies of the sacrificial plastic mold used in the electroplating step.

Some of the many uses of the invention include microscale chem/bio detectors, portable or miniaturized medical diagnostic equipment, DNA analysis equipment, optical switches and related equipment, inertial sensing devices, and other miniaturized devices.

It is to be understood that while the invention has been described in conjunction with the preferred specific embodiments thereof, the foregoing description and the examples that follow are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

EXAMPLE 1

Figure 4A:
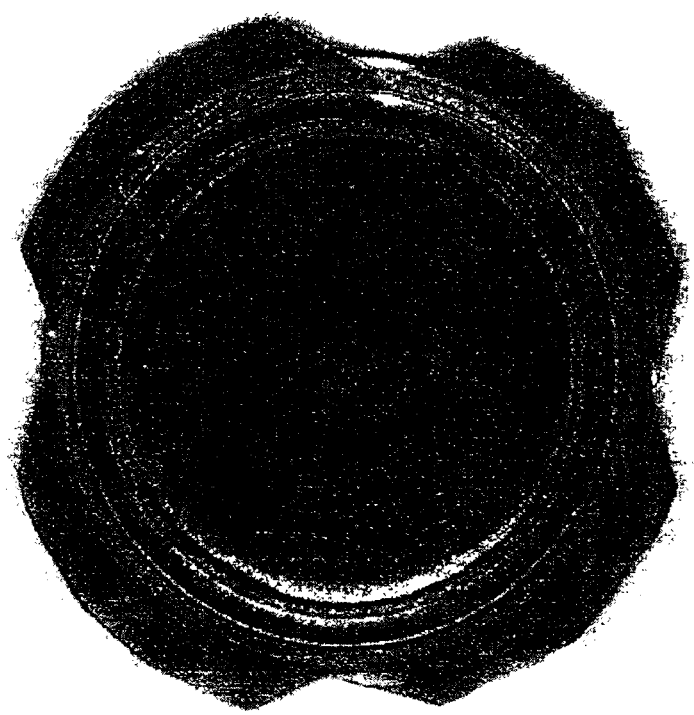
FIG. 4A shows a circular sacrificial PMMA mold containing a micro-etched stainless steel screen as the electroplatable base.
Figure 4B:
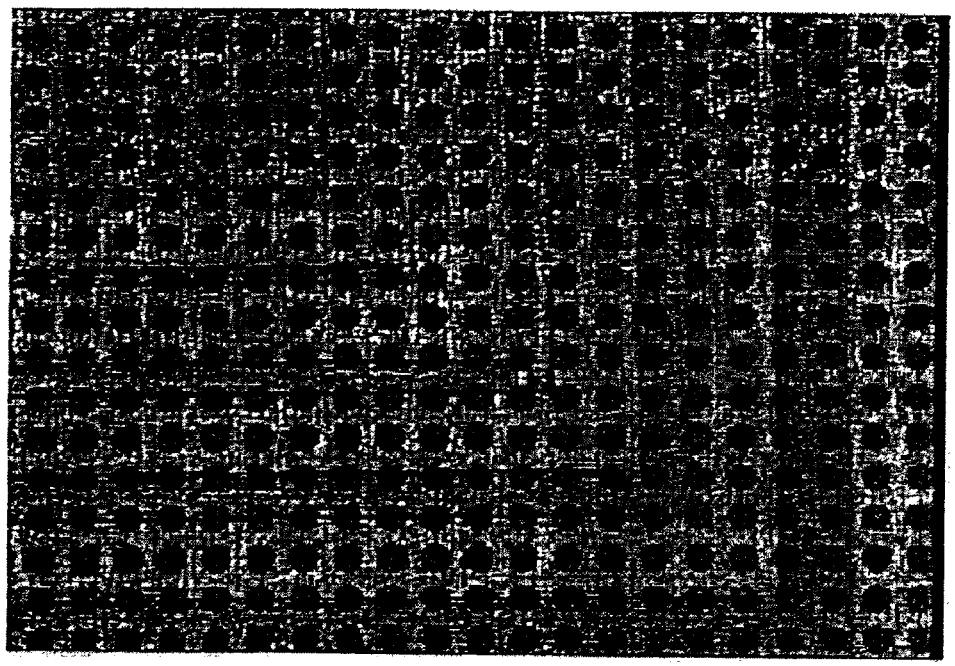
FIG. 4B shows a close-up of some of the features in the PMMA mold and the underlying micro-etched screen shown in FIG. 4A.
Figure 5:
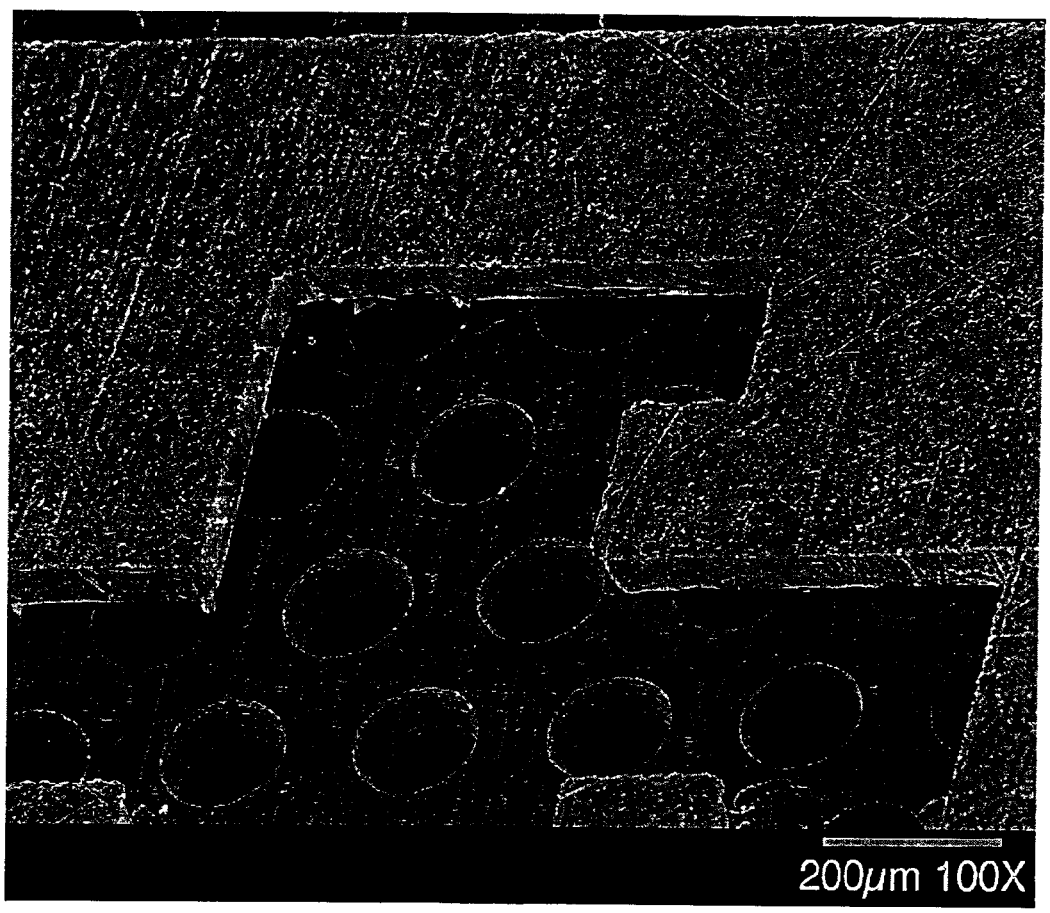
FIG. 5 shows a SEM photograph of a microstructure made according to the method described in Example 2.
Figure 6:
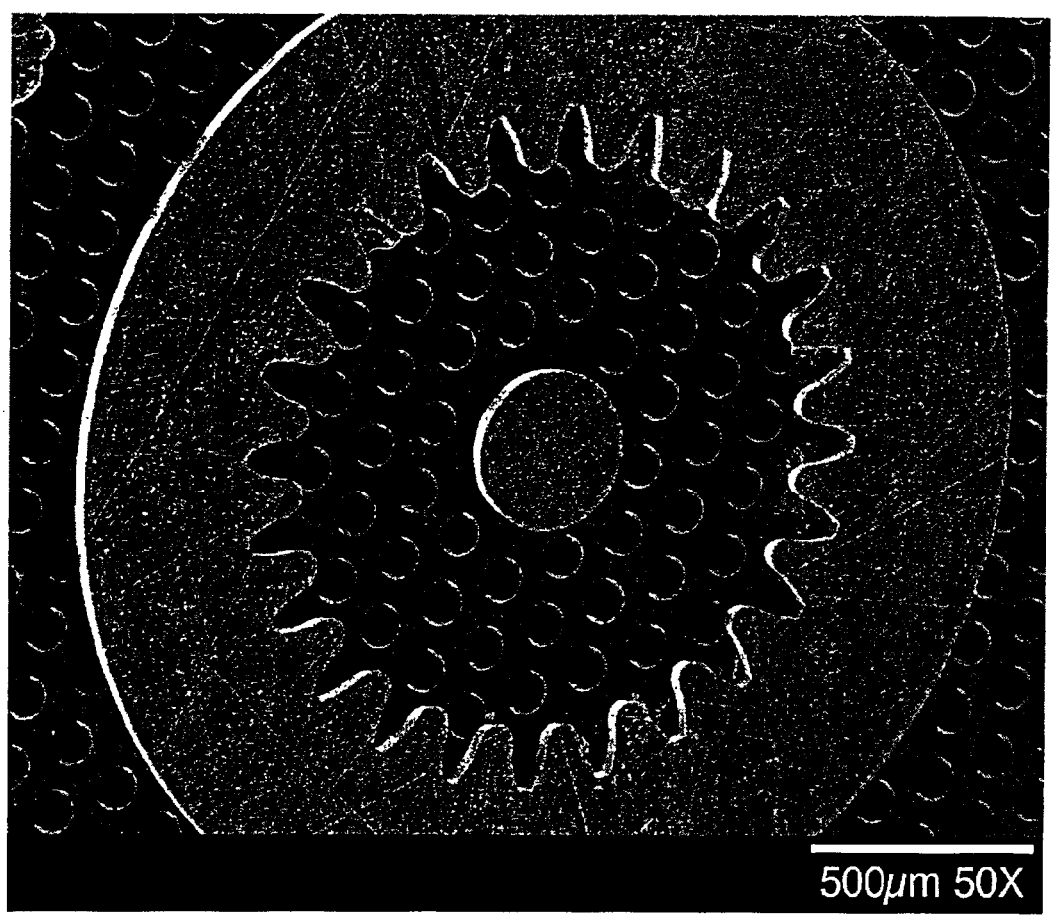
FIG. 6 shows a SEM photograph of a microstructure made according to the method described in Example 2.

A plastic disk (⅛ inch thick×3.5 inch diameter) was molded from polymethyl methacrylate (PMMA, Elf-Atochem V920 grade) and fastened in a circular metal frame having a lid that only covered the edge of the disk to hold it down. This circular lip had a 3⅜ inch diameter. A similar but slightly larger disk of micro-etched stainless steel sheet (from Buckbee-Mears) having a regular hexagonal pattern of tapered holes (hole diameter about 150 microns facing up and about 100 microns facing down) was placed on top of the PMMA before the top portion of the frame with the securing lip was secured. Portions of the metal sheet protruded from the top and bottom portions of the frame and later provided a conducting attachment for the electroplating process. The frame fixture was fastened to the bottom of a large tool steel die equipped with a side vacuum port and a thermocouple channel below the plastic frame. A matching top die to which was fastened a metal embossing tool was lowered into the bottom die. This embossing tool contained a variety of features, all approximately 95 microns deep, ranging from gears and channels of various dimensions to wedge-like structures and other designs. Vacuum was pulled and heating applied through platens attached to the top and bottom dies. When the die thermocouple indicated a temperature of about 165° C., the top die was forced into the softened plastic at a pressure of about 125 psi. The fixturing and plastic were cooled to about room temperature and the electroplatable plastic mold was removed. Examination of the molded part showed that the micro-etched metal sheet had been forced into the PMMA disk while the PMMA flowing through the holes in the metal sheet was patterned with the embossing tool features. Bare metal sheet was visible at the bottom of the embossed features. Such a sacrificial mold is pictured in FIGS. 4A and 4B. FIG. 4A shows a circular sacrificial PMMA mold containing a micro-etched stainless steel screen as the electroplatable base. FIG. 4B shows a close-up of some of the features in the PMMA mold and the underlying micro-etched screen shown in FIG. 4A.

The sacrificial plastic mold was electrolytically cleaned in a 70% v/v sulfuric acid solution at a current density of 150 A/ft² for three minutes. The fresh stainless steel surfaces within the mold were given a Wood's nickel strike in a nickel chloride bath at 50 A/ft² for three minutes followed by a copper seed layer deposited from a copper sulfate bath at 15 A/ft² for ten minutes. The mold was then placed in a nickel sulfamate electroplating bath at 15 A/ft² for seven hours. The features in this mold were only partially plated to a depth of about 35 microns. The PMMA mold was dissolved from the sheet and plated features using acetone.

Examination, including cross-sectioned samples, of the plated features showed excellent plating infill over the holes in the screen. Because the mold was only partially plated in this case, a regular array of dimples in the plated metal indicated where the underlying holes in the sheet were arranged. Dissolution of the copper metal strike in a chromic/sulfuric acid copper etch released the plated nickel structures from the stainless steel porous sheet.

EXAMPLE 2

The process of Example 1 was used except that the holes in the micro-etched sheet were smaller in diameter (about 75 microns, Buckbee-Mears 2-1-8 screen) and were not tapered. A higher melt flow grade of PMMA was also used (Elf Atochem VM-100). The features were over-plated in nickel and then lapped to eliminate the over-plated metal.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following examples and claims.

We claim:

1. A method for making a sacrificial plastic mold having an electroplatable backing comprised of a perforated metal substrate, the method comprising the steps of:
   a) infusing a non-conducting thermoplastic material through the perforated metal substrate into a patterned surface of a tool, that is optionally provided as a tooled mold, so as to conform to the pattern thereof, resulting in microscale features formed from the non-conducting thermoplastic material;
   b) separating the tool from said perforated metal substrate and said infused non-conducting thermoplastic material to provide the sacrificial plastic mold having the perforated metal substrate embedded in the non-conducting thermoplastic material which provides an electroplatable surface and having the microscale features formed from the non-conducting thermoplastic material projecting from the combined surfaces of the non-conducting thermoplastic material and the perforated metal substrate and mold cavities therebetween; and
   c) using the perforated metal substrate in electroplating the microscale features of the sacrificial plastic mold.

2. The method of claim 1, wherein the tool is an embossing tool and step a) comprises:
   placing the perforated metal substrate on the upper surface of a polymeric substrate comprised of the non-conducting thermoplastic material;
   heating the substrates to a temperature effective to soften the non-conducting thermoplastic material; and
   placing the patterned surface of the embossing tool on the perforated metal substrate and pressing the embossing tool into the softened polymeric substrate, whereby the non-conducting thermoplastic material flows through the perforated metal substrate and conforms to the patterned surface of the embossing tool.

3. The method of claim 1, wherein the tool is an embossing tool, and step a) comprises:
   placing a polymeric substrate comprised of the non-conducting thermoplastic material on the upper surface of the perforated metal substrate;

heating the substrates to a temperature effective to soften the non-conducting thermoplastic material; and placing the patterned surface of the embossing tool on the non-conducting thermoplastic metal and pressing the embossing tool into the softened substrate, whereby the non-conducting thermoplastic material flows into the perforated metal substrate and conforms to the patterned surface of the embossing tool, and step (b) comprises removing the embossing tool from the combined non-conducting thermoplastic metal and the perforated metal substrate.

4. The method of claim 1, wherein the tool is a patterned tool and step a) comprises:

placing the perforated metal substrate on the surface of the patterned tool contained within an injection molding cavity;

heating a polymeric substrate comprised of the non-conducting thermoplastic material to a temperature effective to soften the material sufficiently to allow injection molding thereof;

injecting the non-conducting thermoplastic material into the injection molding cavity so that the material conforms to the patterned surface of the patterned tool, and step b) comprises removing the combined non-conducting thermoplastic metal and the perforated metal substrate from the injection molding cavity.

5. The method of claim 1, wherein said sacrificial plastic mold contains more than one level of microscale features.

6. The method of claim 1, wherein more than one perforated metal substrate is embedded in the non-conducting thermoplastic material.

7. The method of claim 1, wherein the electroplated microscale features completely cover the surface of the sacrificial plastic mold.

8. The method of claim 1, further comprising lapping the electroplated sacrificial plastic mold to form a solid base on top of the electroplated microscale features.

9. The method of claim 1, further comprising lapping the electroplated sacrificial plastic mold to form isolated electroplated microscale features.

10. The method of claim 1, further comprising lapping the perforated metal substrate.

11. The method of claim 1, further comprising dissolving said non-conducting thermoplastic material from said sacrificial plastic mold.

12. The method of claim 1, wherein said perforated metal substrate and said electroplated microscale features are comprised of different metals.

13. The method of claim 12, further comprising dissolving said perforated metal substrate without dissolving the electroplated microscale features.

14. The method of claim 1, wherein said perforated metal substrate is comprised of a perforated metal structure covered by a metal coating.

15. The method of claim 14, wherein the perforated metal substrate and the metal coating are comprised of different metals.

16. The method of claim 15, further comprising dissolving the metal coating thereby releasing the electroplated microscale features from the perforated metal substrate.

* * * * *